Figure 1:
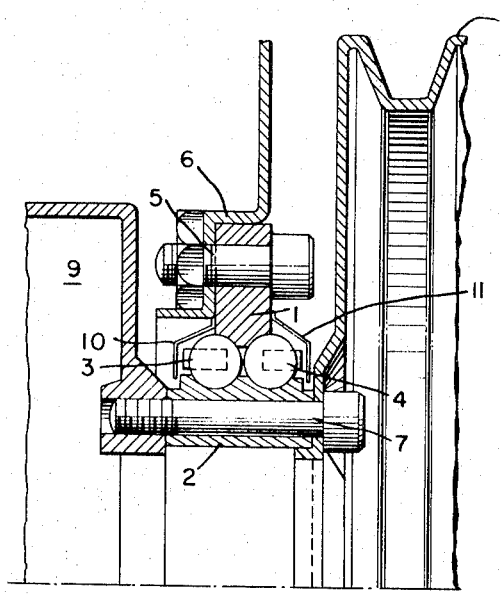

United States Patent [19]
Asberg et al.

[11] 3,819,243
[45] June 25, 1974

[54] BEARING UNIT FOR A ROTATING DRUM

[75] Inventors: Sture Lennart Asberg, Savedalen, Sweden; Domenico Lo Nardo, Piossasco, Italy

[73] Assignee: SFK Industrial Trading and Development Co., N.V., Amsterdam, Netherlands

[22] Filed: Feb. 7, 1972

[21] Appl. No.: 223,909

[30] Foreign Application Priority Data
Feb. 5, 1971 Sweden.......................1426/71

[52] U.S. Cl. .............................................. 308/191
[51] Int. Cl. ........................................... F16c 33/00
[58] Field of Search ................ 308/230, 92; 68/140

[56] References Cited
UNITED STATES PATENTS
757,824   4/1904   Martin .............................. 308/230
907,284   12/1908  Ravencroft ..................... 308/230 X
1,915,549  6/1933  Schenck........................... 308/230 X Primary Examiner—Charles J. Myhre
Assistant Examiner—Frank Sasko
Attorney, Agent, or Firm—Dexter N. Shaw et al.

[57] ABSTRACT

The combination comprising a housing, a drum supported at only one axial end and mounted for rotation about a horizontal axis and drive means for rotating the drum about said axis, and a bearing assembly for rotatably supporting said drum in said housing comprising a pair of spaced annular members having confronting raceways, a plurality of rolling elements in the annular space between said annular members, first connecting means for connecting one of said annular members to said housing, second connecting means connecting the other annular member to said one axial end of said drum and drive means, the connecting means being located closely adjacent said rolling elements, the radius of the smallest pitch circle of the rolling elements and the radial distance between the bearing center and the connecting means connecting the drum and drive means to the bearing assembly being greater than the greatest axial distance between the planes which limit the outer outlines of the rolling elements in the axial direction.

5 Claims, 3 Drawing Figures

PATENTED JUN 25 1974

3,819,243

BEARING UNIT FOR A ROTATING DRUM

The present invention relates to a bearing unit for a rotating drum in a washing machine, centrifuge or the like, which unit comprises two elements, each provided with at least one raceway for rolling bodies situated between the elements, whereby one element is provided with means for fastening the unit against a housing or the like, and the other element is provided with means for joining the element to the rotating drum and a force transmitting member, for instance a belt disc.

Drum washing machines, primarily of domestic types, mostly have a drum which is suspended at one side only. In such a suspension the bearings in the suspension will be subjected to a horizontal rotational axis. It is therefore of the utmost importance that the bearings are designed so that great moments can be taken up. It is also desirable that the bearing is cheap and easy to mount and dismount.

One earlier known solution of the problem of achieving a sufficient moment resistance is that the drum is mounted in bearings on a stub axle provided with two bearings situated at a considerable axial distance from each other, or possibly two rows of rolling bodies arranged in a corresponding manner but rolling directly on the stub axle. In such a design the bearing unit has a rather long axial extension, which is a great disadvantage because it takes up a lot of space. Further, the comparatively small radial dimensions cause that the joining elements between the bearing elements and on one hand the housing and on the outer hand the drum and the force transmitting element are subjected to great stresses caused by the torque of the driving motor.

According to the present invention a bearing unit is achieved which is cheap to produce, easy to mount and dismount, which has a small axial extension but still a great stiffness and in which the members for joining it to the surrounding constructional elements are not subjected to great stresses from the torque of the driving motor, which means that also the surrounding elements can be made simpler with a maintained security. These properties are achieved thereby that the bearing unit is designed so that it comprises two elements, in principle constituting the outer and inner ring in a rolling bearing, which elements are provided with means on one hand for mounting the unit directly on the housing and on the other hand for joining the drum and the force transmitting member to the unit. Further, the smallest pitch radius of the rolling bodies and the radial distance between the bearing centre and the members which connect the drum to the bearing unit are greater than the greatest axial distance between the planes which limit the outer outlines of the rolling bodies in the axial extension. In this design the bearing comprises one or possibly two rows of rolling bodies, in the latter case the rows being situated close to each other. The bending moments caused by the load of the drum and/or the centrifugal force hereby generate axial forces on the rolling bodies. Thanks to the great diameter of the bearing, these forces which are generally reversed proportional to the bearing diameter, are comparatively small. Further, because of the fact that the radial distance between the bearing center and the points of connection between the bearing unit and the surrounding members can be made great, the forces on the respective connecting means caused by the torque of the driving motor can be kept small, whereby these connecting means can be made cheap and simple.

Figure 2:
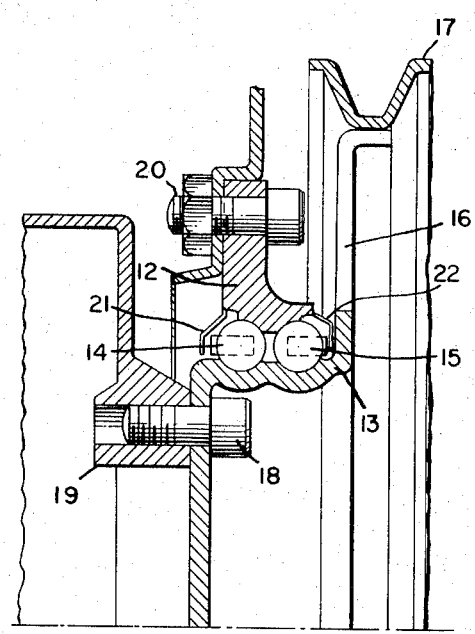
Figure 3:
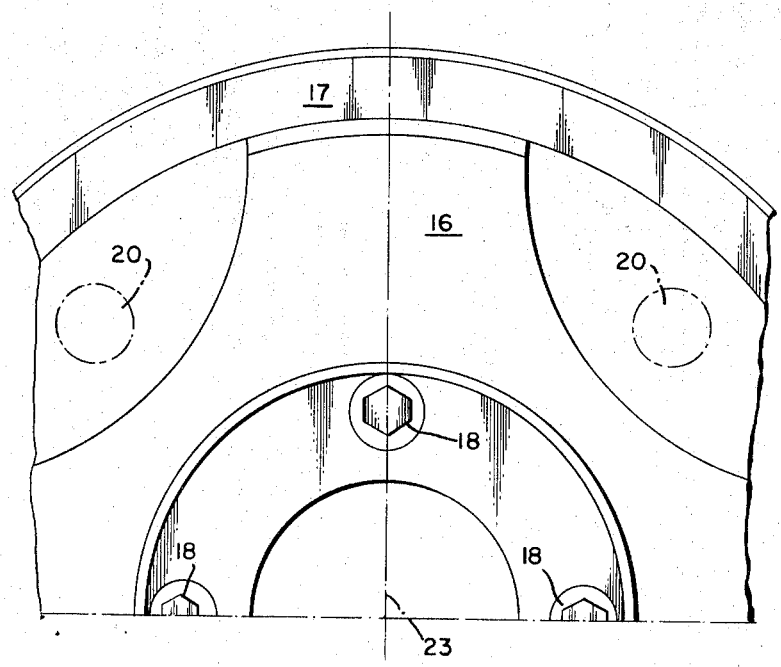

A number of embodiments of the invention will now be described with reference to the accompanying drawing, in which:

FIG. 1 shows a cross section of one embodiment; and
FIGS. 2 and 3 show a section and a view of another embodiment.

In FIG. 1 is shown a part of a bearing unit according to the invention. The unit comprises an outer element 1 and an inner element 2 and intermediate rolling bodies 3,4, in this example, two rows of balls. On each bearing element 1 and 2 raceways for the balls are provided. These raceways are shown to be provided directly in the elements 1, 2, but of course the races also can consists of a layer of another material which is integral in the respective element.

In the outer element 1 around a radial flange a number of holes 5 are provided, which holes are intended for bolts for connecting the element to the housing 6. Correspondingly, a number of holes 7 are provided around the inner element 2, which holes are intended for bolts connecting the bearing to a belt disc 8 and a drum 9.

A sealing device 10 is provided integral with the bearing unit, which seal prevents detergents or the like from penetrating into the bearing. At the opposite side of the bearing a sealing element 11 is provided, which prevents external dirt from penetrating into the bearing.

In the FIGS. 2 and 3, a cross section and a view of a part of another embodiment of the invention is shown. The outer bearing element 12 is designed in a way corresponding to what is shown in FIG. 1, but the inner element 13 consists of a pressed sheet metal construction with integral raceways for balls 14, 15, and also comprising a number of spoke-like flanges 16 which are surrounded by a belt drive groove 17. This groove is fixed to the spokes for instance by welding.

The inner element 13 is connected to the drum 19 by bolts 18. The outer bearing element is connected to the housing with bolts 20.

In the embodiment of FIG. 3 all bolt connections are axial and easily accessible for mounting and dismounting of the bearing unit. The bearing is protected from detergents or the like by the seal 22 (FIG. 2). As can be seen, the inner bearing element can be made as a simple pressed sheet metal part 13. The bolts are easily accessible for mounting and dismounting of the bearing unit.

Also other embodiments of the invention are of course possible within the scope of the following claims.

We claim:
1. The combination comprising a housing, a drum supported at only one axial end and mounted for rotation about a horizontal axis and drive means for rotating the drum about said axis, and a bearing assembly for rotatably supporting said drum in said housing comprising a pair of spaced annular members having confronting raceways, a plurality of rolling elements in the annular space between said annular members, first connecting means for connecting one of said annular members to said housing, second connecting means connecting the other annular member to said one axial end of said drum and drive means, the connecting means being located closely adjacent said rolling elements, the radius of the smallest pitch circle of the rolling elements and the radial distance between the bearing center and the connecting means connecting the drum and drive means to the bearing assembly being greater than the greatest axial distance between the planes which limit the outer outlines of the rolling elements in the axial direction.

2. The combination as claimed in claim 1 wherein the housing, drum and drive means are detachably connected to said connecting means.

3. The combination as claimed in claim 1 wherein the drive means is nondetachably connected to said other annular member.

4. The combination as claimed in claim 1 wherein the connecting means comprise axially disposed bolt connectors.

5. The combination as claimed in claim 1 wherein the drum and drive means are connected to said other annular member by one connecting means.

* * * * *